(12) United States Patent
Bucks et al.

(10) Patent No.: US 8,596,166 B2
(45) Date of Patent: Dec. 3, 2013

(54) RECIPROCATING SAW BLADE WITH PLUNGE NOSE

(75) Inventors: Brent L. Bucks, Lakewood Ranch, FL (US); Jeremy A. Lowder, Shelby, KY (US)

(73) Assignee: Black & Decker Inc., Newark, DE (US)

( * ) Notice: Subject to any disclaimer, the term of this patent is extended or adjusted under 35 U.S.C. 154(b) by 61 days.

(21) Appl. No.: 13/465,599

(22) Filed: May 7, 2012

(65) Prior Publication Data

US 2012/0216656 A1    Aug. 30, 2012

Related U.S. Application Data

(63) Continuation of application No. 12/261,186, filed on Oct. 30, 2008.

(60) Provisional application No. 61/007,232, filed on Dec. 11, 2007.

(51) Int. Cl.
B23D 63/00    (2006.01)

(52) U.S. Cl.
USPC .............................................. 76/112; 83/835

(58) Field of Classification Search
USPC .................. 76/112; 83/835, 846–855; D8/20; 30/392–394
See application file for complete search history.

(56) References Cited

U.S. PATENT DOCUMENTS

| | | | |
|---|---|---|---|
| 1,390,400 A * | 9/1921 | Threet | 30/408 |
| 2,510,462 A * | 6/1950 | Christenson | 76/29 |
| 2,646,094 A | 7/1953 | Russell | |
| 2,890,728 A | 3/1957 | Craven | |
| 3,033,251 A | 5/1962 | Atkinson | |
| 3,063,310 A * | 11/1962 | Connoy | 76/112 |
| 3,111,970 A | 11/1963 | Priest | |
| 3,117,472 A * | 1/1964 | Mingus et al. | 72/335 |
| 3,357,462 A | 12/1967 | Craven | |
| 3,477,479 A | 11/1969 | Doty | |
| 3,540,317 A * | 11/1970 | Stanley | 76/112 |
| 3,630,699 A * | 12/1971 | Catlin | 51/293 |
| 3,964,163 A | 6/1976 | Russo | |
| 4,027,390 A | 6/1977 | Kendzior | |
| 4,610,185 A * | 9/1986 | France | 76/29 |
| 5,119,708 A | 6/1992 | Musgrove | |
| 5,295,417 A * | 3/1994 | Beck et al. | 76/25.1 |
| 5,295,426 A | 3/1994 | Planchon | |
| 5,517,889 A | 5/1996 | Logan | |

(Continued)

FOREIGN PATENT DOCUMENTS

| | | |
|---|---|---|
| DE | 1503939 A | 9/1969 |
| DE | 8805767 U1 | 6/1988 |
| DE | 202004017351 | 3/2006 |
| EP | 0786302 B1 | 6/2002 |

*Primary Examiner* — Stephen Choi
(74) *Attorney, Agent, or Firm* — Scott B. Markow

(57) ABSTRACT

A method for manufacturing a reciprocating saw blade includes forming a plurality of teeth into coil stock, feeding the coil stock into a die set, locating at least one of the plurality of teeth on the coil stock in the die set, flattening a portion of said teeth on said coil stock in said die set; forming a first tooth and a first gullet of a reciprocating saw blade out of the flattened portion of the coil stock in the die set, and forming a reciprocating saw blade having a first tooth with a first gullet, the first gullet being enlarged with respect to remaining gullets of said plurality of gullets.

18 Claims, 4 Drawing Sheets

(56) References Cited

U.S. PATENT DOCUMENTS

| | | |
|---|---|---|
| 5,855,158 A | 1/1999 | Donofrio |
| 5,884,547 A | 3/1999 | Carlsen et al. |
| 5,918,525 A | 7/1999 | Schramm |
| 6,125,544 A | 10/2000 | Eriksson |
| 6,244,152 B1 | 6/2001 | Di Nicolantonio |
| 6,289,767 B1 * | 9/2001 | Cookson ............ 76/112 |
| 6,427,573 B1 | 8/2002 | Carlsen et al. |
| 6,601,495 B2 | 8/2003 | Cranna |
| D482,945 S * | 12/2003 | Grolimund ............ D8/20 |
| 6,782,781 B2 | 8/2004 | Rack |
| 7,036,415 B2 * | 5/2006 | Tsujimoto ............ 83/661 |
| 7,127,979 B2 | 10/2006 | Kocher et al. |
| 7,174,823 B2 | 2/2007 | Cranna |
| 7,225,714 B2 | 6/2007 | Rompel et al. |
| 2002/0184988 A1 | 12/2002 | Roman et al. |
| 2003/0010179 A1 | 1/2003 | Mcluen |
| 2003/0051593 A1 | 3/2003 | Kocher et al. |
| 2005/0211046 A1 | 9/2005 | Thomas et al. |

* cited by examiner

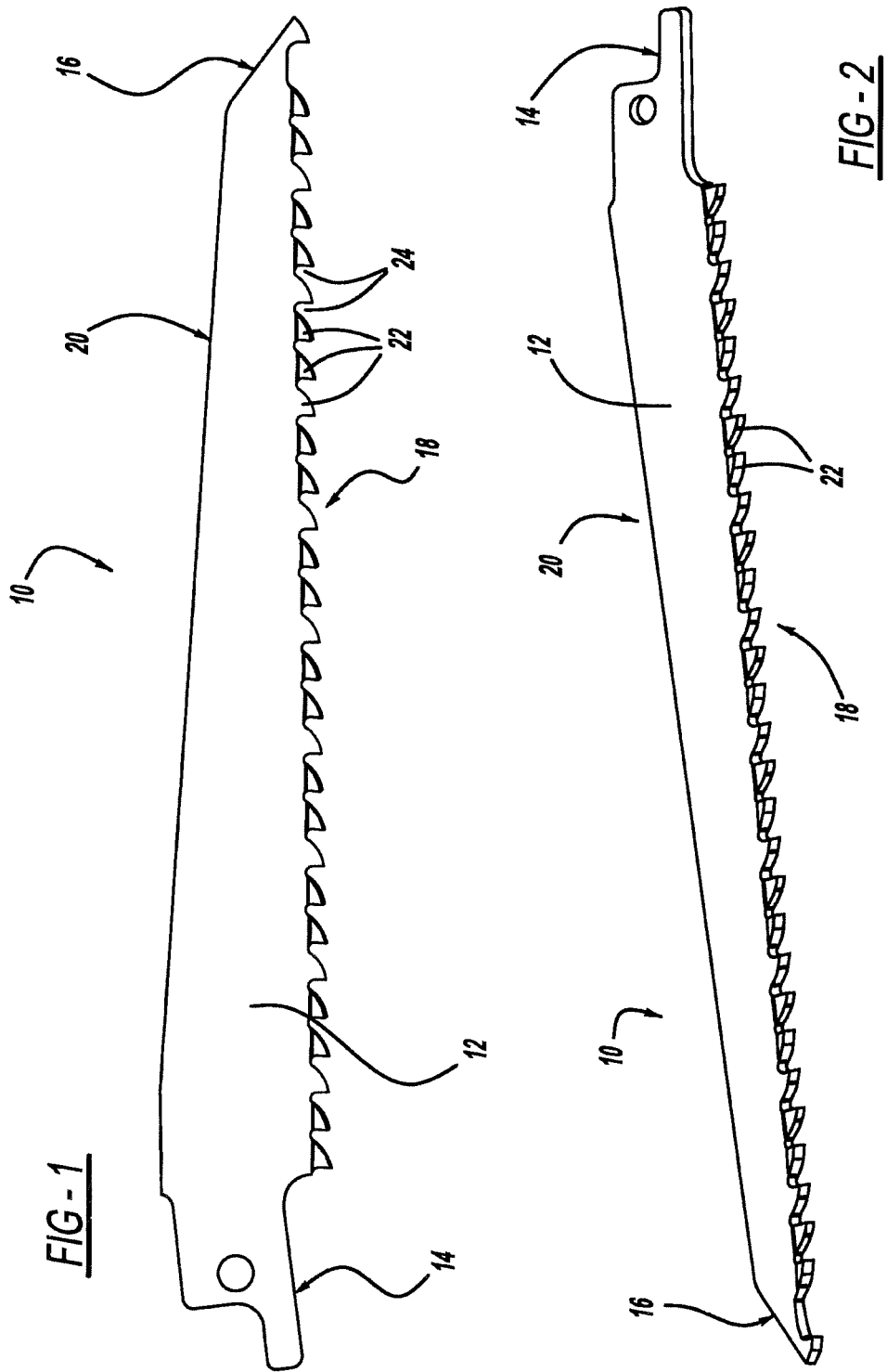

RECIPROCATING SAW BLADE WITH PLUNGE NOSE

CROSS-REFERENCE TO RELATED APPLICATIONS

This application is a continuation of U.S. patent application Ser. No. 12/261,186, filed Oct. 30, 2008, titled "Reciprocating Saw Blade with Plunge Nose," currently pending, which claims the benefit of U.S. Provisional Application No. 61/007,232, filed on Dec. 11, 2007. The entire disclosures of each of these applications is incorporated herein by reference.

FIELD

The present disclosure relates to reciprocating saw blades and, more particularly, to reciprocating saw blades with a plunge nose, and to methods of manufacturing such reciprocating saw blades.

BACKGROUND

Numerous trades utilize reciprocating saws and blades to cut various objects. Plumbers utilize reciprocating saw blades to cut PVC pipe as well as to rough in holes in sub flooring. Heating and ventilating contractors utilize reciprocating saw blades to cut vents into sub flooring. Contractors utilize reciprocating saws to frame windows, doors, and the like. Also, renovation contractors utilize reciprocating saw blades to cut through nails and the like to remove walls and the like. These users rely on reciprocating saw blades that cut fast, have a desirable blade life or durability and enable easy plunge cutting that provides a fast, as well as a controlled cut. Available reciprocating saw blades that are utilized to plunge cut have a nose that, when it is plunged into the sub flooring or a workpiece, creates an enlarged inaccurate kurf. Thus, the reciprocating saw blade haphazardly bites into the workpiece. This slows the cutting process as well as provides the user with little or no control when plunging the reciprocating saw blade into the workpiece. Thus, it would be desirable to have a reciprocating saw blade that rapidly plunges into the workpiece to provide an accurate kurf while enabling fast cutting of the workpiece.

Accordingly, the present disclosure provides the art with such a reciprocating saw blade. The present reciprocating saw blade pierces the workpiece for fast and accurate plunge cutting. The present saw blade provides easy plunge cutting and provides the user with a controlled cut which, in turn, is also a fast cut. The reciprocating saw blade has an extended blade life that provides significant durability. The present reciprocating saw blade provides faster removal of swarf from the kurf. The present saw blade provides a first full raker tooth that quickly pierces the workpiece to provide faster cutting of the workpiece.

SUMMARY

In accordance with the first aspect of the disclosure, a reciprocating saw blade comprises a body with two ends and two edges. A first shanking end secures the blade with the reciprocating saw. The second end is a plunging end to enter into a workpiece. A first edge has a plurality of teeth and gullets. The second back edge opposes the first edge. The plurality of teeth has a first tooth immediately adjacent the plunging end. The first tooth is a full tooth and is also a raker tooth or unset tooth. The first tooth has a relief face angle of about 35° to 50°. A first gullet is adjacent the first tooth. The first gullet has a size at least 1.5 times the gullet size of the remaining gullets of the plurality of gullets. The gullet size is generally from 2 to 5.5 times the size of the remaining gullets of the plurality of gullets. The plunging end has an end face on an angle of about 35° to 45° with respect to a longitudinal axis of the blade. The plunging end has an end surface intersecting the first tooth to form a cutting edge. The plurality of teeth is set teeth.

Accordingly to another aspect of the disclosure, a reciprocating saw blade comprises a body with two ends and two edges. The first shanking end secures the blade with a reciprocating saw. A second plunging end is present to enter a workpiece. A first edge has a plurality of teeth and gullets. The second back edge opposes the first edge. The plurality of teeth has a first tooth immediately adjacent the plunging end. The first tooth is a full tooth and is also a raker or unset tooth. The first tooth has a relief face angle of about 35° to 50°. The remainder of the plurality of teeth have substantially the same size, also the gullets have substantially the same size. One tooth immediately adjacent the first tooth of the plurality of teeth is missing from the plurality of teeth forming a gap between the first tooth and the plurality of teeth. Two teeth of the plurality of teeth may be missing forming a larger gap. The plunging end has an end surface on an angle of about 35° to 45° with respect to the longitudinal axis of the blade. The plunging end has an end surface intersecting the first tooth to form a cutting edge. The plurality of teeth is set teeth.

Accordingly to a third aspect of the disclosure, a method for manufacturing a reciprocating saw blade comprises forming a plurality of teeth into a coil stock. The coil stock is fed into a die set. Teeth on the coil stock are located in the die set. A portion of the teeth on the coil stock is flattened. A first tooth and a first gullet of a reciprocating saw blade and a third tooth are formed into the flattened portion of the coil stock. The reciprocating saw blade is formed with a first tooth and a first gullet with the first gullet being enlarged with respect to the remaining gullets of a plurality of gullets. The flattening step includes flattening at least three teeth of the plurality of teeth. The coil stock is punched to form the first tooth and the first gullet of the saw blade. The teeth are milled and set into the coil stock. The set teeth are flattened to form the first tooth as a raker or unset tooth. The first gullet has size 1.5 to 5.5 times the size of the remaining gullets of the plurality of gullets.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a side elevational view of a reciprocating saw blade in accordance with the present disclosure.

FIG. 2 is a perspective view of FIG. 1 rotated approximately 90°.

DETAILED DESCRIPTION

Figure 3:
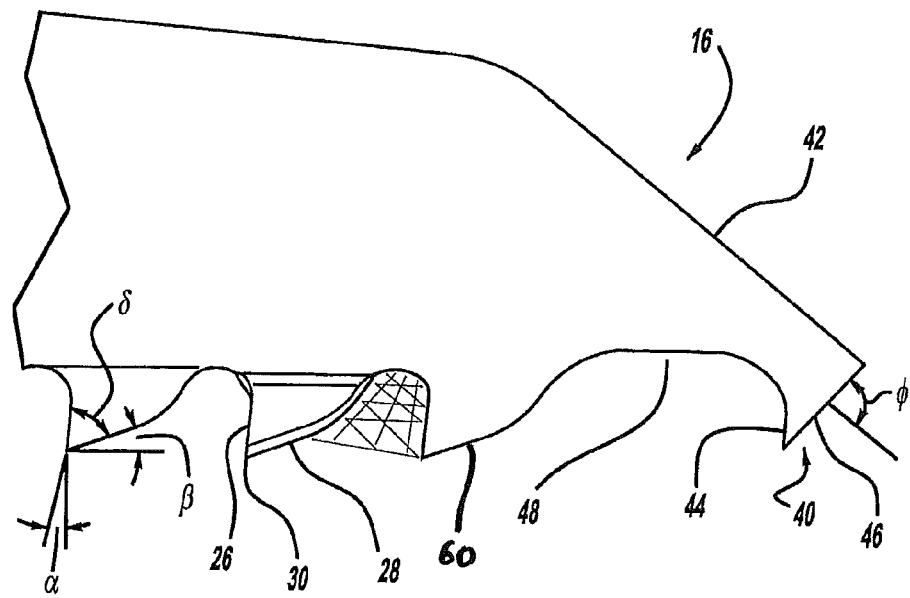
FIG. 3 is an enlarged elevational view of the nose of FIG. 1.
Figure 4:
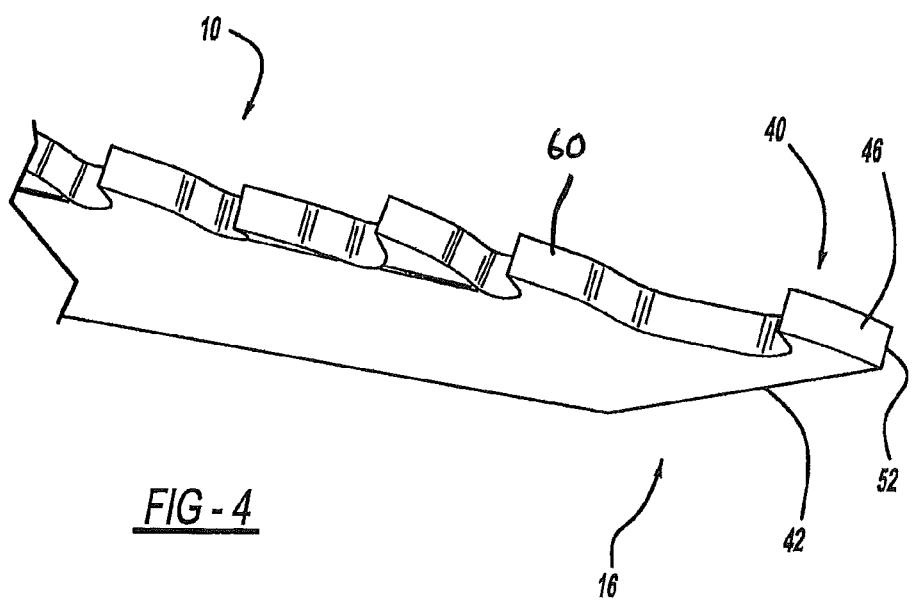
FIG. 4 is a view like FIG. 3 rotated approximately 90°.

The following description is merely exemplary in nature and is not intended to limit the present disclosure, application, or uses.

Turning to the figures, particularly FIG. 1, a reciprocating saw blade is illustrated and designated with the reference numeral 10. The reciprocating saw blade 10 includes a body 12 which has a first shanking end 14 and a plunging nose end 16. The body 12 includes two edges. The first edge is a cutting edge 18 and the second edge is an opposing back edge 20. The cutting edge 18 includes a plurality of teeth 22. Each tooth includes a gullet 24. The gullets 24 are substantially identical and all have substantially the same size. Additionally, the teeth 22 are substantially identical and all have substantially the same size. Also, the teeth 22 are set teeth alternating left and right, separated by a raker, left, right. The left and right set can be alternated to provide a desired saw blade. The set of the teeth provides spacing for the body 12 and clearance for the back edge so that it can be maneuvered through the created kurf.

The plurality of teeth 22 includes a rake face 26 and a relief face 28. The rake face 26 and relief face 28 intersect one another to form a cutting edge 30. The rake face 26 is preferably at a rake angle $\alpha$ of about 3° to 10°. The relief face 28 is at a relief angle $\beta$ from about 15° to 35°. The tooth 22 has an included angle $\delta$ of about 45° to about 72°.

The gullets 24 have a desired volume as illustrated in the shaded area of FIG. 3. The volume of each of the gullets 24 is substantially the same for all of the gullets 24.

The plunging end 16 has a first tooth 40 adjacent the end surface 42 of the plunging nose 16. The tooth 40 is a full tooth and is also a raker or unset tooth. The tooth 40 has substantially the same rake face 44 and rake angle as that previously discussed. The relief surface 46 is on a relief angle $\phi$ from about 35° to about 50°. Preferably, the relief angle is about 45°. The first tooth 40 may be offset toward the back edge 20 from a line through the cutting edges 30 to about 0.25 mm. This insures a sharp cutting edge on the first tooth 40.

A first gullet 48 is positioned adjacent the rake face 44. The first gullet 48 has a size from 1.5 to 5.5 times, preferably 2 to 5.5 times, the size of the remaining gullets 24. Thus, an enlarged gullet 48 is formed between the first tooth 40 and the remainder of the plurality of teeth 22. A second tooth has been removed or is missing from the plurality of teeth 22 to form the gap which creates the first gullet 48. Thus, by removing a tooth, this allows the first tooth 40 to cut into the workpiece so the third tooth 60 (first tooth of the remainder of the plurality of teeth 22) cannot engage or alter the path of the first tooth. Additionally, the third tooth 60 is preferably a raker or straight tooth This provides for a straight groove cut into the workpiece that is not influenced by the set plurality of teeth 22. Also, by having the first tooth 40 and a larger gullet, faster and greater chip removal is provided as well as an increased cutting speed.

The end surface 42 of the plunge nose 16 is on an angle of 35° to 45° and preferably 39° with respect to the longitudinal axis of the blade. This aggressive angle provides for clearance of the plunge nose 16 to enable it to plunge faster into the workpiece. Also, the end surface 42 intersects the relief surface 46 of the first tooth to form a cutting edge 52 at the tip of the blade. An included angle of about 60° to 90° is formed between the end surface 42 and relief surface 46. This enhances the chipping action of the reciprocating saw blade 10 once the saw blade enters into the kurf of the workpiece.

Figure 5:
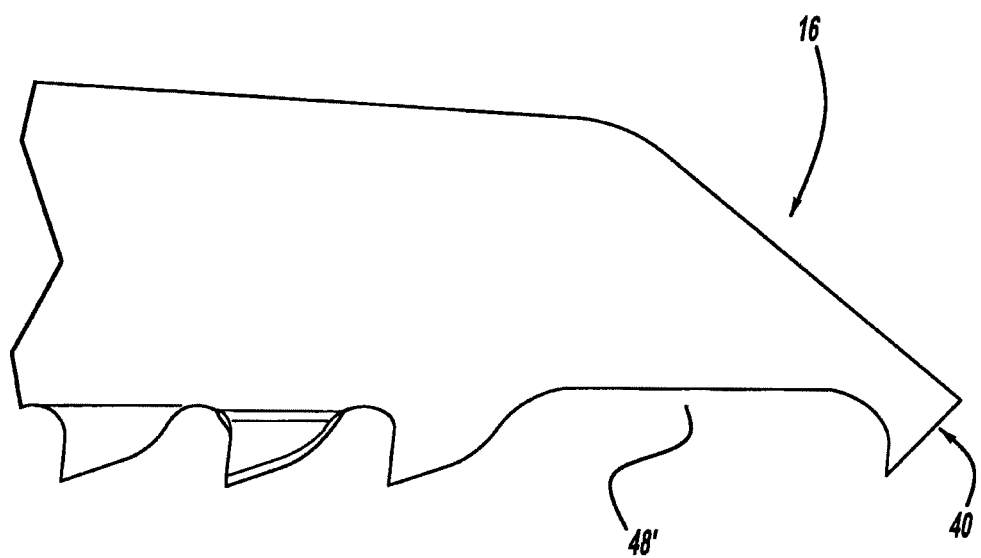
FIG. 5 is an elevational view of an additional embodiment of the present invention.

FIG. 5 illustrates a second embodiment. Here, the saw blade is the same as that previously disclosed; however, two teeth are missing out of the plurality of teeth behind the first tooth 40. This provides an even larger first gullet 48' about 5.5 times the size of the remaining gullets. This enables the fast removal of chips to provide a faster cutting reciprocating saw blade.

Figure 6:
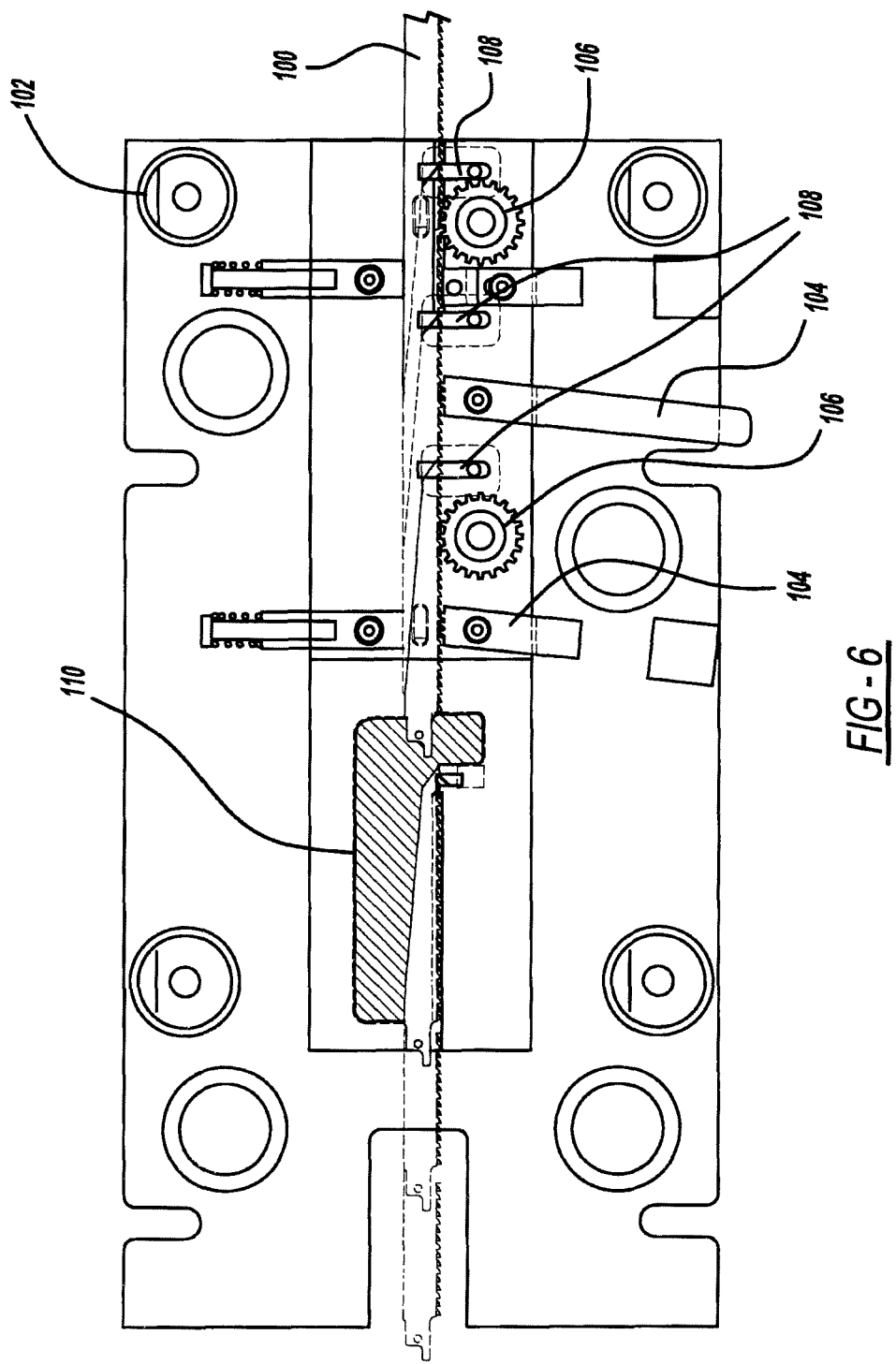
FIG. 6 is a schematic view of a method of manufacturing a saw blade.

Turning to FIG. 6, a method for manufacturing the blades is illustrated. Here, a stock coil 100 is fed into a die set 102. The coil stock 100 has had the teeth milled and set into the coil. The coil is unwound to have the teeth milled and set and then rewound after the teeth have been milled and set into the coil stock 100. The coil stock 100 is then fed into the die set 102. As the coil stock 100 enters the die set 102, the teeth 22 are located by a pilot stop 104. Two pilot stops 104 are illustrated which may be used on different size reciprocating saw blades. Since the die set 102 may be utilized to stamp 6", 9" and 12" blades, only one die set 102 is needed to manufacture all three sizes. Rollers 106 advance the coil stock 100 into the die set 102. The pilot stops 104 locate the teeth and continue with the coil stock 100 into the die set. Coil stock 100 is stopped to enable a punch 108 to flatten at least three teeth of the teeth. The flattening occurs by compressing the punch together to provide a region that now has no defined tooth set but a straight flat portion. The coil stock 100 continues to be fed into dies 110. As the coil stock 100 is positioned into the dies 110 with the fattened portion at the end of the dies 110. The dies 110 are closed and a punch progression begins to form the first tooth 40 as well as the enlarged gullet 48 into the flattened portion of coil stock to form the saw blade. Also, as this occurs, the coil stock 100 is continuously fed into an opening into the die 110 which forms the shanking end of the next reciprocating blade. It should be noted that the flattening, forming of the first tooth and enlarged gullet, as well as the forming of the shank end, takes place simultaneously in the die set at different locations along the die set. After the punching, the blade 10 exits the die set 102 with a first tooth and gullet as well as the plurality of teeth as explained above.

The description of the invention is merely exemplary in nature and, thus, variations that do not depart from the gist of the invention are intended to be within the scope of the invention. Such variations are not to be regarded as a departure from the spirit and scope of the disclosure.

What is claimed is:

1. A method for manufacturing a reciprocating saw blade comprising:
    forming a plurality of teeth into coil stock;
    feeding said coil stock into a die set;
    locating at least one of the plurality of teeth on said coil stock in said die set;
    flattening a portion of said plurality of teeth on said coil stock in said die set;
    forming a first tooth and a first gullet of a reciprocating saw blade out of said flattened portion of said coil stock in said die set; and
    forming a reciprocating saw blade having said first tooth with said first gullet, said first gullet being enlarged with respect to remaining gullets of said plurality of gullets.

2. The method of claim 1, wherein flattening a portion of said plurality of teeth comprises flattening at least three teeth of said plurality of teeth.

3. The method of claim 2, wherein flattening the at least three teeth comprises flattening at least said first tooth and a third tooth.

4. The method of claim 1, further comprising wherein forming said first tooth and said first gullet comprises punching said coil stock to form said first tooth and said first gullet.

5. The method of claim 1, further comprising milling and setting said plurality of teeth on said coil stock.

6. The method of claim 1, wherein said first gullet has a size 1.5 to 5.5 times the size of remaining gullets of said plurality of gullets.

7. A method for manufacturing a reciprocating saw blade comprising:
   feeding coil stock into a die set, the coil stock having a plurality of teeth and a plurality of gullets formed on the coil stock;
   flattening a portion of said plurality of teeth on said coil stock in said die set;
   locating at least one of the plurality of teeth on said coil stock in the die set;
   actuating a first die of the die set to form an enlarged first gullet behind a first tooth of the reciprocating saw blade, the enlarged first gullet having a size approximately 1.5 to 5.5 times the size of remaining gullets in the plurality of gullets.

8. The method of claim 7, wherein the plurality of gullets in the coil stock each have approximately the same size.

9. The method of claim 8, wherein the plurality of teeth in the coil stock each have approximately the same size.

10. The method of claim 7, wherein actuating the first die comprises performing a punching operation to form the enlarged first gullet.

11. The method of claim 7, further comprising actuating a second die to form a shank end of the reciprocating saw blade.

12. The method of claim 11, further comprising actuating a third die to flatten at least the first tooth of the reciprocating saw blade.

13. The method of claim 12, wherein the steps of actuating the first die, actuating the second die, and actuating the third die are performed substantially simultaneously.

14. The method of claim 11, wherein the size of the enlarged first gullet is approximately twice the size of each of the remaining gullets in the plurality of gullets.

15. A method for manufacturing a reciprocating saw blade comprising:
   feeding coil stock into a die set, the coil stock having a plurality of teeth and a plurality of gullets formed on the coil stock, the plurality of teeth each having substantially the same size, the plurality of gullets each having substantially the same size;
   locating at least one of the plurality of teeth on said coil stock in the die set;
   performing a first punching operation with the die set to form an enlarged first gullet behind a first tooth of the reciprocating saw blade, the enlarged first gullet having a size approximately 1.5 to 5.5 times the size of each of the remaining gullets in the plurality of gullets;
   performing a second punching operation with the die set to form a shank end of the reciprocating saw blade; and
   performing a flattening operation with the die set to flatten at least the first tooth of the reciprocating saw blade.

16. The method of claim 15, wherein the steps of performing the first punching operation and performing the second punching operation are performed substantially simultaneously.

17. The method of claim 16, wherein the step of performing the flattening operation is performed substantially simultaneously with the steps of performing the first punching operation and performing the second punching operation.

18. The method of claim 15, wherein the size of the enlarged first gullet is approximately twice the size of the of each of the remaining gullets in the plurality of gullets.

* * * * *